United States Patent [19]

Jönsson

[11] Patent Number: 5,579,756
[45] Date of Patent: Dec. 3, 1996

[54] COMBINATION HEATER

[75] Inventor: Sigurd Jönsson, Kristianstad, Sweden

[73] Assignee: Alde International Systems AB, Kristianstad, Sweden

[21] Appl. No.: 367,451

[22] Filed: Dec. 30, 1994

[51] Int. Cl.$^6$ ........................................................ F24H 1/20
[52] U.S. Cl. .................... 126/360 R; 126/361; 126/101; 122/55; 122/95.1; 122/136 R
[58] Field of Search .............................. 126/361, 362, 126/360 R, 101; 122/16, 17, 18, 19, 14, 55, 95.1, 136 R

[56] References Cited

U.S. PATENT DOCUMENTS

| 4,127,107 | 11/1978 | Melgeorge | 126/361 |
| 4,662,350 | 5/1987 | Massbach | 126/101 |

FOREIGN PATENT DOCUMENTS

| 0157893 | 10/1985 | European Pat. Off. . |
| 0262263 | 6/1988 | European Pat. Off. . |
| 1460368 | 10/1966 | France . |
| 4033537 | 6/1991 | Germany . |
| 7804976 | 3/1979 | Sweden . |
| 2257242 | 6/1993 | United Kingdom . |

*Primary Examiner*—Carroll B. Dority
*Attorney, Agent, or Firm*—Ladas & Parry

[57] ABSTRACT

Heating apparatus for producing both central heat and tap water, specifically adapted for trailers and similar mobile houses with small spaces is provided. The heat source is a burner combusting LP-gas. Heat cartridges for electric heating optionally provide a supplemental heat source. The burner operates in a cylindrical space consisting of a burner tube with a plurality radial flanges which conduct heat energy outwards to a ring-shaped space delimited by a second tube. A heat medium for central heating is contained in the ring-shaped space. A tube-shaped vessel for tap water surrounds the ring-shaped space. The tap water vessel, the second tube and the burner tube are respectively positioned inside each other. The burner tube is closed at one end and is provided with a baffle extending axially in the burner tube and having a lower surface which is spaced from its upper surface and a closed end which is spaced from the closed end of the burner tube, the baffle further being spaced from the burner and from the bottom of the burner tube so as to provide a path for returning combustion gases produced by the burner.

14 Claims, 3 Drawing Sheets

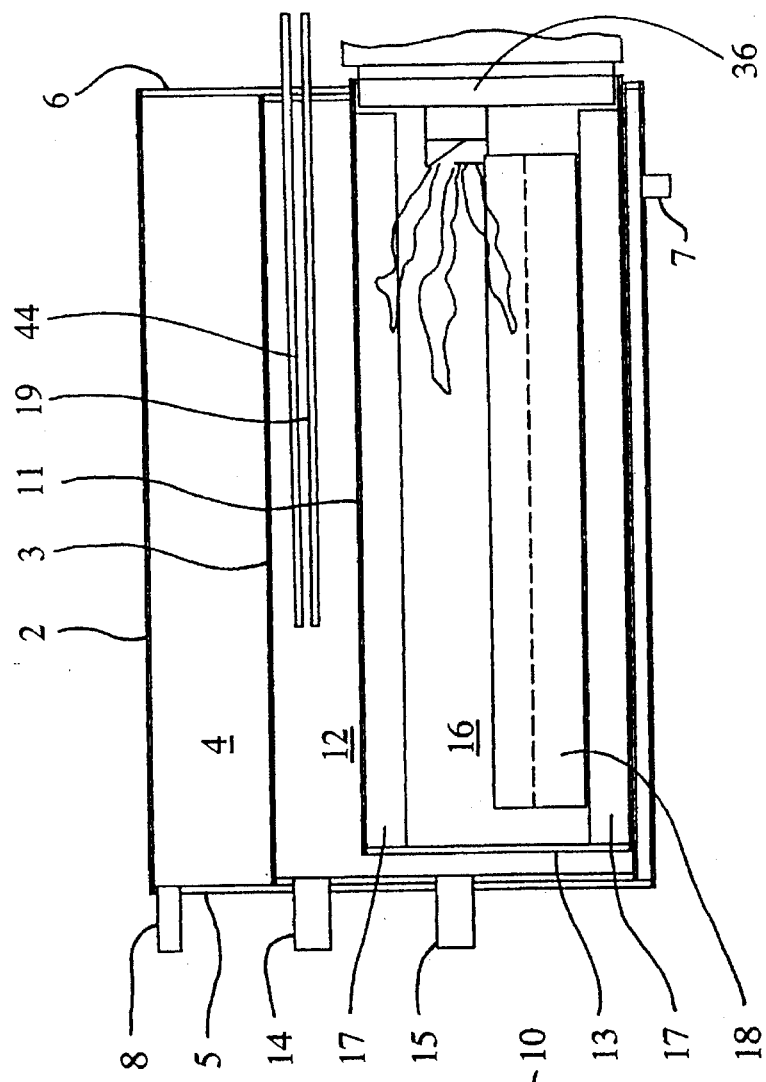
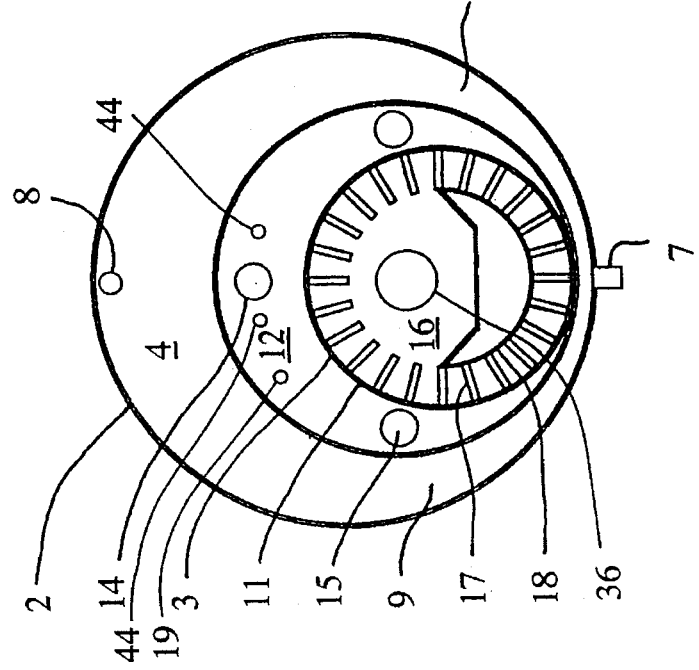
Fig 2
Fig 1

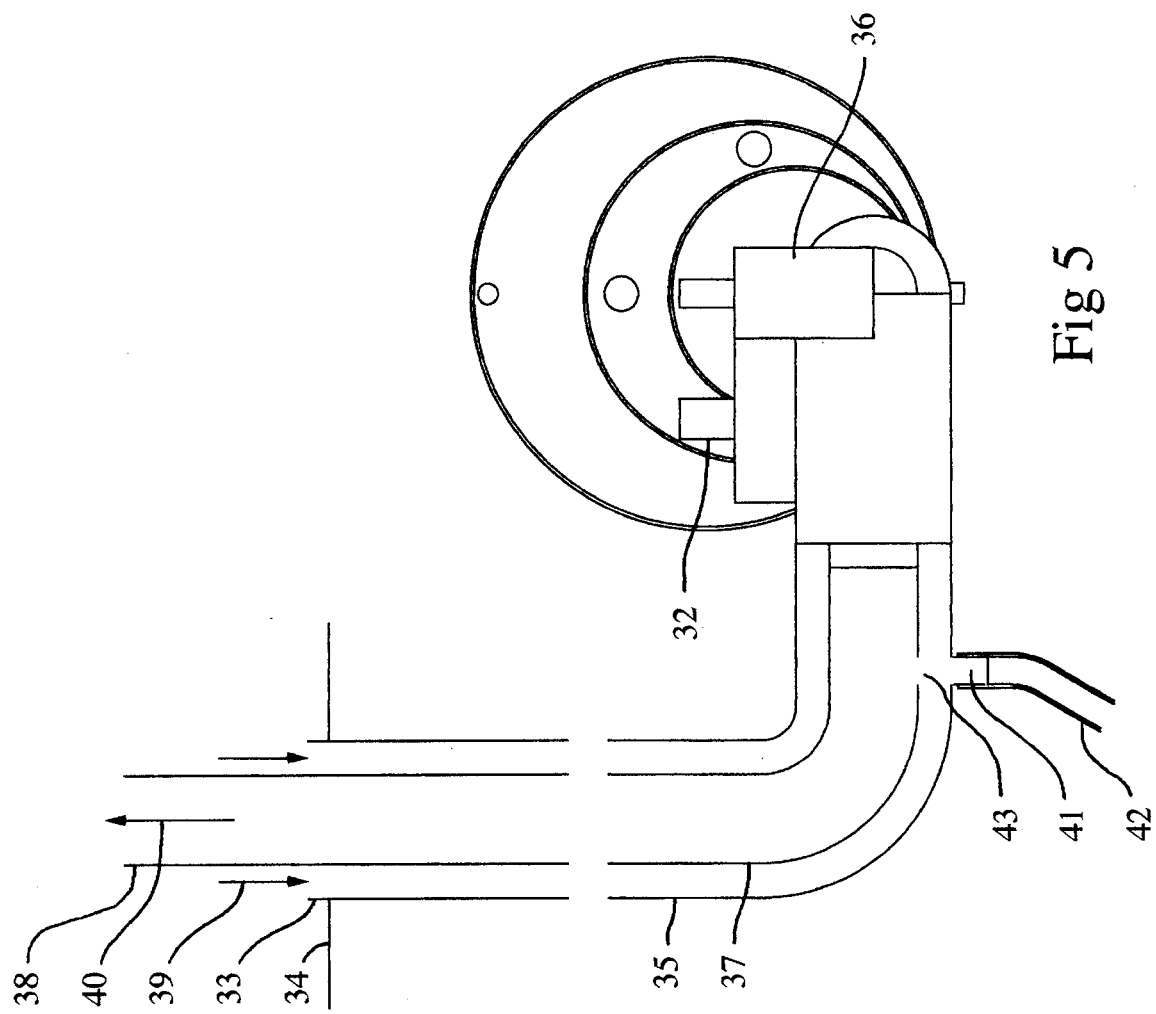

COMBINATION HEATER

The present invention relates to a heater for providing central heating and hot water in a trailer, house car, camping boat or similar.

PRIOR ART

Swedish Patent Specification No. 7804976-4 discloses a heater for trailers or similar moveable housing. The hot combustion gases from a LP-burner or similar pass a heat exchanger in the nature of a tube with radial flanges. The flanges extend outside the surface of the tube. A heat medium is enclosed inside a second tube concentric with the heat exchanger. The heat medium is used for central heating and is fed to radiators of the caravan. Outside the second tube, in an alternative embodiment, there is a spiral tube comprising further heat medium used for hot tap water. The equipment is positioned in a housing with relatively small cross-sectional area but a large height forming a relatively compact equipment.

French Patent Specification No. 1460368 discloses a heater intended for a small house or other larger permanent housing. The heater comprises a laying tap water cylinder with a volume of for example 1200 liters. A burner is positioned inside a second cylindrical tube positioned eccentrically in the lower part of the tap water cylinder. The burner tube is provided with radial flanges for absorbing heat energy from the burner. A third tube is concentrically positioned outside the burner tube and encloses a heat medium for central heating via radiators etc. The third tube is provided with flanges extending out in the tap water cylinder for improving the heat transfer.

DISCLOSURE OF THE INVENTION

The object of the present invention is to provide a heater specifically adapted for trailers and similar mobile housings with small spacings and thus is very compact. The heater according to the invention produces central heat energy as well as hot tap water. The heat source is a burner burning LP-gas or a similar energy source, or alternatively an immersion heater for electric heating. The burner operates in a cylindrical space made up of a burner tube with several radial flanges conducting heat energy outwards to a ring-shaped space between the burner tube and a second tube where the heat medium for central heating is placed. A tube-shaped tap water vessel surrounds the ring-shaped space.

According to the invention, the tap water vessel, the second tube and the burner tube are positioned one inside the other so that the second tube is positioned in the tap water vessel and the burner tube is eccentrically positioned in the second tube. The burner tube is closed at one end and is provided with a baffle extending axially in the burner tube and having a lower surface which is spaced from its upper surface and a closed end which is spaced from a closed end of the burner tube, said baffle further being spaced from the burner and from the bottom of said burner tube so as to provide a path for returning combustion gases produced by the burner. A fan is connected to one end of the burner tube for feeding combustion air. An exhaust line is connected to the lower portion of the burner tube for exhausting the combustion gases to the atmosphere.

Moreover, the inlet line for the combustion air is concentric with and surrounding the exhaust line. The inlet line is provided with a first opening adjacent its lowermost portion for expelling possible condense water to the surroundings. The exhaust line is provided with a second opening opposite said first opening for giving off the condense water to the inlet line and further on to the surroundings.

The heater according to the invention may also be adapted for air-supported central heating. In this case, the heater tube is provided with radial flanges extending from the interior of the burner tube and through its shell surface out to the ring-shaped space for heat exchange with and heating of the air for the central heating. The second tube is provided, at its lower portion, with a heat transferring plate covering a predetermined arc of the lower portion of the second tube. The lower flanges of the burner tube contact the heat transferring plate and rest thereon. The upper flanges do not reach the surface of the second tube not covered by the heat transferring plate. In this manner, the heat energy is transmitted directly from the lower flanges via the heat transferring plate to the tap water vessel. Thus, the flanges can have a higher temperature without the tap water being overheated, as is explained in more details below.

SHORT DESCRIPTION OF THE DRAWINGS

Further objects, advantages and features of the invention will be described in more details with reference to preferred embodiments of the invention shown on the appended drawings, in which:

FIG. 1 is a cross-sectional view of the heater according to the invention;

FIG. 2 is a longitudinal sectional view of the heater according to FIG. 1:

FIG. 5 is a cross-sectional view showing the burner and fan and lines in connection therewith.

DETAILED DESCRIPTION OF PREFERRED EMBODIMENTS

Figure 4:
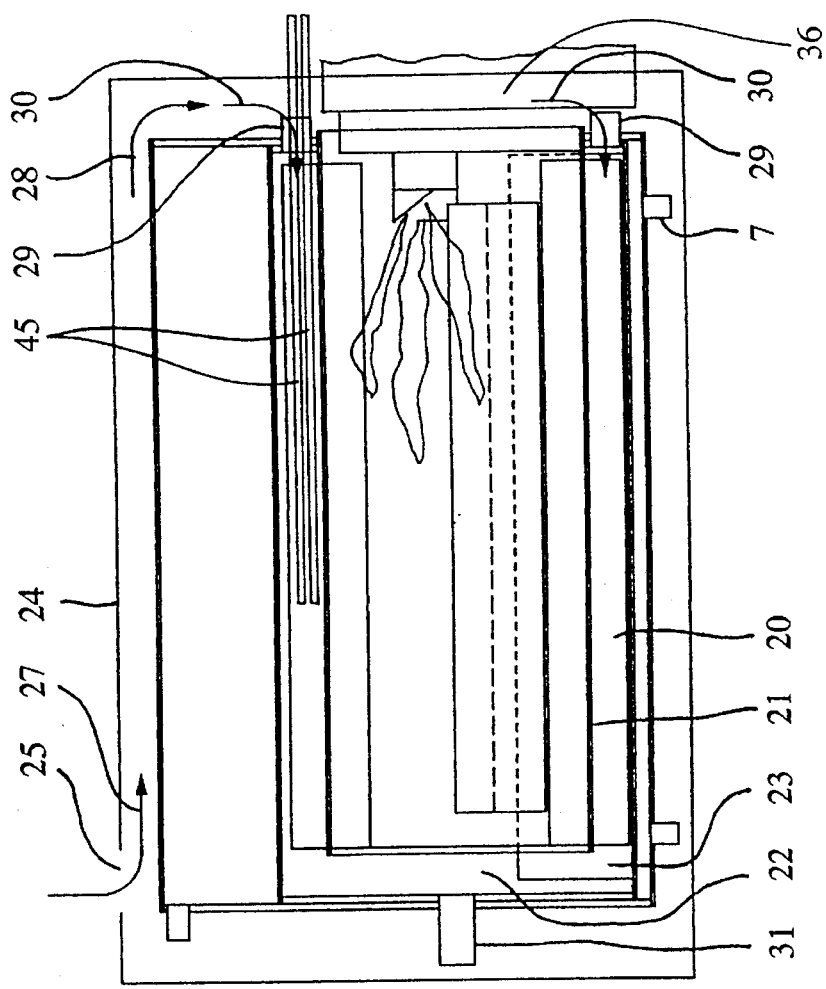
FIG. 4 is a longitudinal sectional view with a cover for the burner put in place.

FIG. 1 shows the heater 1 according to the invention in cross-section. The heater comprises in principle three horizontal, inside each other positioned eccentric tubes forming annular spaces there between intended to enclose the heat medium.

There is an outer first tap water tube 2 and a second tube 3 enclosed therein defining a space 4 for tap water there between. The space 4 is closed at its both ends by gables 5, 6, compare FIG. 2. The second tube 3 is eccentrically positioned in the tap water tube 2, so that a narrow portion is formed in the lower portion of space 4 and a larger portion at the upper portion (seen according to FIG. 1). Thus, the largest portion of the volume of space 4 will be positioned at the upper portion above the second tube 3.

An inlet 7 to space 4 is positioned at the bottom portion and an outlet 8 is positioned at the upper portion of space 4. The inflow of tap water takes place in two expanding channels 9, 10 defined by second tube 3 and tap water tube 2, as clearly appears from FIG. 1. Thus, the velocity of the water is decreasing smoothly so that stratification of the tap water in space 4 will be disturbed in as small extent as possible. It might be suitable to adapt two inlets (and two outlets) along the length of the tap water tube 2 so that axial flow also will be minimised.

In the preferred embodiment of the invention, the volume of the space 4 is about 8.4 liters.

A burner tube 11 is positioned eccentrically in the second tube 3 and forms a ring-shaped space 12 with the same shape as tap water space 4, but smaller. The ring-shaped space 12 encloses a heat medium to be used in the central heating system of the caravan, usually a mixture of water and glycol.

The burner tube 11 is shorter than the second tube 3 and its inner end is closed by a gable or bottom 13. In the embodiment of the invention shown, there are two inlets 15 and one outlet 14 to the ring-shaped space 12 all positioned in gable 5 closing the second tube 3. A circulation pump (not shown) circulates the heat medium to radiators positioned in the space to be heated by the central heating system.

In the preferred embodiment of the invention, the volume of the ring-shaped space 12 is about 4,1 liters.

Thus, the burner tube 11 forms a cup-shaped space 16 delimited by burner tube 11 and the gable bottom 13 of said tube, the upper surface of baffle 18 facing the inner surface of burner tube 11 having a concave configuration. The cup-shaped space 16 is provided with several radially and axially extending flanges 17 extending inwards from the shell surface of tube 11. Inside the flanges there is a baffle 18 composed of a tube with the cross-section shown in FIG. 1. The baffle 18 is shorter than burner tube 11 so that a space is formed between the inner end of baffle 18 and bottom 13 of burner tube 11. Moreover, there is a bottom in the baffle so that the baffle is closed at the inner end.

In the cup-shaped space 16 above the baffle, a LP-gas burner is positioned (not shown ). The burner is of a construction known per se and delivers a flame in the space 16 above the baffle. Air is supplied to the flame and the space 16 from an inlet and via a pump so that the air flows axially and parallel with flanges 17. Thus, the hot combustion gases deliver heat energy to flanges 17 and preferentially to those flanges positioned in the upper portion of space 16.

When the combustion gases reach the inner end of space 16, they pass axially back below baffle 18 and emit their remaining heat energy to those flanges at the lower portion of burner tube 11. Finally, the combustion gases pass out to the surroundings via a line as is described in more details below.

The LPG-burner and the pump are attached to the lower end of tube 11 with a flange and several screws. Moreover, there is provided a suitable sealing. Thus, the LP-gas and the combustion gases are enclosed inside tube 11 and can never reach the area inside the caravan.

The outer shell surface of burner tube 11 will be heavily heated by the LPG-burner while the heat is transmitted to the shell surface by flanges 17. The heat energy is then transmitted to the heat medium inside the ring-shaped space 12. A thermostatic body 19 inside space 12 senses the temperature of the heat medium.

The heat energy is then further transmitted from the heat medium in the ring-shaped space 12 to the tap water in space 4.

The operation of the heating apparatus according to the invention is as follows: When the thermostatic body 19 senses that the temperature of the heat medium is below a predetermined value, for example 70° C., the LPG-burner is started by known means. The burner heats flanges 17, which deliver heat energy to the heat medium positioned in the ring-shaped space 12, whereby the temperature rises. When the temperature exceeds a predetermined second temperature level, for example 80° C., the LPG-burner is shut off.

However, there is a comparatively large mass in the flanges 17, which thus will carry a relatively large amount of heat energy. Thus, the burner will be activated during relatively long periods and with relatively long pauses there between.

The heat requirement of the caravan is in turn sensed by a room thermostat controlling a circulation pump circulating the hot heat medium from the ring-shaped space 12 and to radiators positioned inside the caravan.

Since the temperature of the heat medium in the ring-shaped space 12 varies only to a small extent between 70° C. and 80° C. the tap water in the vessel 2 will achieve a temperature in this range. Any specific control of the temperature of the tap water is usually superfluous. However, for safety reasons, there is an excess temperature sensor of the tap water, which prevents activation of the LPG-burner if the temperature of the tap water exceeds for example 98° C., which indicates a malfunction.

As an additional heat source, there are two electric heaters positioned in the ring-shaped space for heating the heat medium therein. The exact position is not critical and can differ in dependence of the desired design.

At certain occasions, water-supported heat energy is not used in caravans and similar mobile housings, but instead air-supported central heating is used where air is used as heat source. i.e. hot or warm air is introduced into the caravan. The heating apparatus according to the invention is easily adapted to such air-supported heating.

Figure 3:
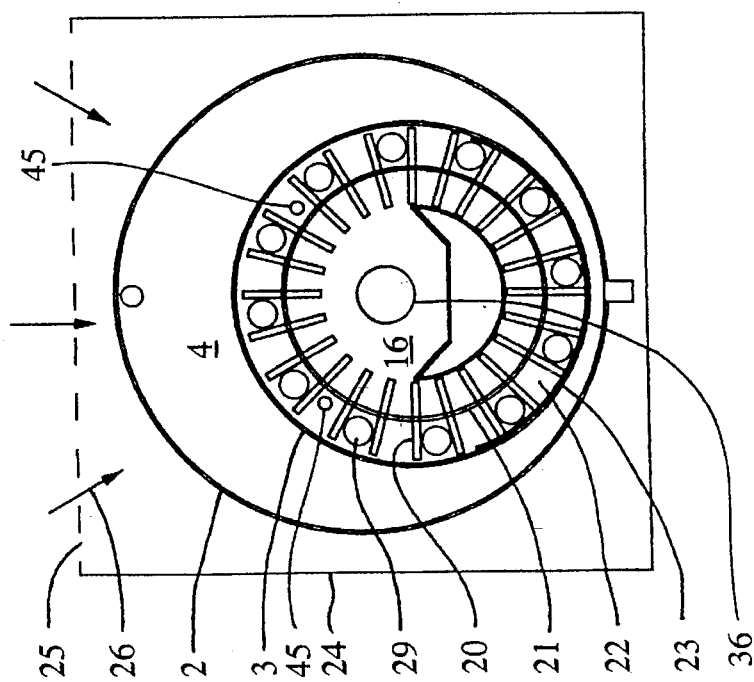
FIG. 3 is a cross-sectional view similar to FIG. 1 but with an insert for air-supported central heating.

Such an embodiment is shown in more details in FIG. 3. As appears therefrom, the burner tube is modified so that the radial flanges extend beyond the shell surface and into the ring-shaped space 12. The flanges 20 extend almost up to the inner surface of the second tube 3, which means that the burner tube 21 is only slightly concentric with the second tube.

The ring-shaped space 22 between the second tube 3 and the burner tube 21 comprises the air to be heated in this embodiment. The air is heated against the outer portions of the flanges 20 and thus, has a large area for heat transfer. However, in this embodiment the flanges are considerably hotter than in the first embodiment and must as a rule exceed 100° C. in order that sufficient heating of the air should take place.

By this high temperature of the flanges, there is a risk that the tap water will be heated to above 100° C. Thus, specific safety measures must be undertaken.

Thus, the burner tube 21 and its flanges 20 are adapted so that the outer diameter of the flanges is somewhat smaller than the inner diameter of the second tube 3 so that the flanges 20 never reach up to the inner surface of the second tube 3. However, the lower portion of the tube 3 is provided with a heat transferring plate 23 against which the radial flanges 20 abut. Thus, heat energy is transmitted directly from the lower flanges 20 and to the heat transferring plate 23 and thence to the lower portion of the tap water space 4 in the vicinity of the inlet 7 for cold water.

The heat transferring plate 23 is so dimensioned that right balance is obtained between the heat energy transferred to the circulating air and the heat energy transmitted to the tap water. For making more easy the heat transfer, a heat transmitting paste may be positioned between the heat transferring plate and the second tube. In this way, the heat transfer coefficient between the plate and the tube is minimised.

Since the flanges at the upper portion do not touch the second tube, the heat transfer from the flanges to the tube will be rather small and essentially consisting of convection heat transfer via the air which should be heated. However, this air is rather cold and thus, any effective heat transfer does not take place to the tap water. If however, the air circulation ceases, for example by the fact that the air circulation fan stops, the heat transfer between the flanges and the second tube can be considerable and causing overheated the tap water.

In order to decrease the risk for such overheated tap water, there is one further measure undertaken. As is shown in FIG. 4, the entire heating apparatus is positioned in a cover 24. The air to be heated is sucked inside the heater through openings 25 positioned in the front portion of the cover 24 above the first tube 2 according to arrows 26 and 27 and thus cools the upper, warmest outer surface of the tap water vessel 2 at the same time as the air is preheated. The air then passes along the entire tube 2 and thence radially inwards to the end of the tube 21 according to arrow 28, and thence into several openings 29 according to arrows 30. Suitably, there are several openings 29 along the periphery of the ring-shaped space 22 so that the air passes beyond all flanges and takes up heat energy from the flanges. Finally, the air passes out through an outlet 31 and via suitable lines and nozzles to the interior of the caravan to be heated.

In this embodiment, it is also of importance that the flanges have a large mass, which accumulates a relatively large amount of heat energy.

In this embodiment, there is an excess temperature sensor preventing the operation of the heat source if the temperature of the tap water exceeds for example 98° C. Electric cartridges used as an additional heat source are preferably places adjacent the flanges.

As appears from that stated above, the heat transferring plate can be dimensioned so that right balance is achieved between air-supported central heating and tap water.

It is suitable to make the second tube and its flanges through extrusion in aluminum. At the same time, the surfaces of the flanges can be profiled or riffled so that the surface areas thereof increase still further, which is especially important at air-supported central heating.

It is realised that the combustion gases passing beyond the lower flanges already are cooled and thus, the lower flanges will always be colder than the upper flanges. This fact is used automatically according to the invention, since cold water is supplied at the lower flanges, whereby still a large temperature differential exists, and thus and effective heat transfer. In the embodiment with air-supported central heating, the lower flanges are similarly used for heating the tap water, which has a lower temperature, while the upper flanges with high temperature are used for heat exchange with the air, in which a high temperature difference is necessary. Preferably, the heating apparatus further includes a baffle as described above with respect to the first embodiment of the invention.

The air for the combustion in the burner is supplied by means of a fan 32 from an inlet 33 positioned at the roof 34 of the caravan, see FIG. 5. From the inlet 33 there is a suction line 35 to the fan 32 positioned adjacent the burner 36 and then to the nozzle of the burner. LP-gas is supplied to the nozzle via a separate line (not shown). At the nozzle there are electrodes which upon activation delivers a spark igniting the LP-gas. A monitor device of a type known per se controls if ignition takes place and cuts off the supply of LP-gas at no flame.

The combustion gases are taken out from the lower portion of the burner tube to an exhaust tube 37, which runs concentric inside the inlet line 35 to a chimney 38 at the roof of the caravan. Thus, there is obtained a balanced inlet of combustion air and exhaust of combustion gases in a manner known per se. The flow directions are shown with arrows 39 and 40.

At the lowest point of the inlet line 35, there is a first hole 41 for letting out possible condensate water. The hole is connected to a hose 42 leading down below the caravan. Opposite said first hole 41, there is a second hole 43 on the exhaust tube 37, which lets out possible water from the inlet line 35 and further through the first hole 41 and the hose 42.

By this arrangement, there is automatically obtained an outflow of condensate water. The pressure in the inlet line 35 at the first hole 41 is a small negative pressure, which makes sure that no exhaust gases can pass out through the hose 42 but a small air flow in the opposite direction is achieved. The pressure in the exhaust tube at the second hole 43 is a small over pressure, but this second hole leads to the inlet line and the combustion gases cannot pass out through the hose. Instead, these are re-circulated to the burner.

Herein above have been described two embodiments of the invention with reference to the appended drawings. However, it is realised that the invention is not limited to the solutions shown on the drawings but can be modified within certain limits. Such for a skilled person obvious modifications should of course be included within the scope of the invention.

It is specifically noted that in FIG. 3 several inlet openings 29 are shown, but it is realised that the lower inlet openings very well can be left out, specially those in connection with the heat transferring plate.

In FIG. 4 there is shown two inlets for tap water, but it is realised that more than two inlets can be used. It is also advantageous to use several tap water outlets.

Moreover, there is shown in FIG. 2 that the inlet 15 and the outlet 14 for the heat medium is positioned in the same gable 5, whereby the heat medium will spool over the outer surface of the burner tube 11 in an arc and turn back to the outlet. It is however realised that it also can be suitable to arrange inlet at one end and outlet at the other end.

The tap water vessel 2 and the second tube 3 are shown as cylindrical vessels, which is suitable since they should be able to withstand a relatively high pressure. However, it is also possible to adapt the tap water vessel with another shape, which can be suitable, such as partly rectangular shape. In the last-mentioned case, the volume of the vessel can be used still better for obtaining a compact heater with a large volume of hot tap water.

By using lying cylinders, the ability of the water to form layers (stratification) is better used, which is of great importance in connection with the tap water vessel. By the expanding channels 9 and 10, there is obtained an effective breaking of the incoming water jet energy and the movement energy is transmitted to pressure in a smooth transition. The inlet 7 also opens to the shell surface of the second tube, which entails redirection and spreads the water flow. The hot water can undisturbed rise to the upper part of the tap water vessel. Such an effective stratification cannot be obtained at standing cylinders, which is almost the only version at heaters for mobile housings.

By adapting the burner tube eccentrically inside the second tube, the advantage is obtained that the lower flanges can transmit the heat energy thereof almost directly to the tap water, while the upper flanges transmit the energy thereof essentially to the heat medium. By adapting the number of upper and lower flanges and the size of the baffle and the placing thereof, the ratio between the heat transfer to the tap water and to the heat medium can be influenced upon and balanced at construction. Moreover, the countercurrent principle is used so that the colder combustion gases act against the cool incoming tap water.

It has been stated above that the burner is a LP-gas burner, but it is realised that also other types of burners can be used, such as burners for diesel oil etc.

The invention is only limited by the appended patent claims.

I claim:

1. Heating apparatus for heating tap water and for central heating of a mobile house such as a trailer, comprising: a burner as a heat source, the burner being positioned within a burner tube, said burner tube, comprising a plurality of radially inwardly directed flanges depending about the inner surface of said burner tube; and a second tube surrounding said burner tube and forming a ring-shaped space between the burner tube and said second tube, said ring-shaped space containing a heat medium for central heating; and a tap water vessel surrounding said ring-shaped space, said tap water vessel, said second tube and said burner tube being respectively positioned inside each other with the burner tube eccentrically positioned inside the second tube; wherein said apparatus further includes a baffle extending axially in the burner tube and having a lower surface which is spaced from its upper surface and a closed end which is spaced from a closed end of the burner tube, said baffle further being spaced from the burner and from the bottom of said burner tube so as to provide a path for returning combustion gases produced by the burner.

2. Heating apparatus according to claim 1, wherein an inlet line including a fan is connected to an upper portion of the burner tube for feeding combustion air to the burner and an exhaust line is connected to a lower portion of the burner tube for exhausting the combustion gases to the atmosphere.

3. Heating apparatus according to claim 2, wherein said inlet line for the combustion air is concentric with and positioned outside said exhaust line, and wherein said inlet line is provided with a first opening adjacent its lowermost portion for giving off possible condensate water to the surroundings and the exhaust line is provided with a second opening opposite said first opening for giving off condensate water to the inlet line and thence further to the surroundings.

4. Heating apparatus for heating tap water and for central heating of a mobile house such as a trailer, comprising: a burner as a heat source, the burner being positioned in a burner tube; and a second tube surrounding said burner tube and forming a ring-shaped space between the burner tube and said second tube, said ring-shaped space containing air for central heating; and a tap water vessel surrounding said ring-shaped space, said burner tube comprising radial flanges extending from the interior of the burner tube and through the surface thereof to the ring-shaped space for heat exchange with and heating of the air for central heating; and wherein said second tube is provided with a heat transferring plate covering a predetermined part of the lower portion of said second tube, the flanges of the burner tube being in contact with said heat transferring plate.

5. Heating apparatus according to claim 4, wherein said flanges do not reach up to the surface of the second tube at the portion of the second tube which is not covered by the heat transferring plate.

6. Heating apparatus according to claim 5, wherein a heat transmitting means, such as a heat transmitting paste, is provided between the second tube and the heat transferring plate.

7. Heating apparatus according to claim 4, wherein the burner tube and the flanges are made of extruded aluminum.

8. Heating apparatus according to claim 7, wherein the surfaces of the flanges are riffled to increase the heat transferring surface area.

9. Heating apparatus according to claim 4, further comprising a baffle extending axially in the burner tube and having a lower surface which is spaced from its upper surface and a closed end which is spaced from a closed end of the burner tube, said baffle further being spaced from the top and the bottom of said burner tube so as to provide a space for the burner and a path for returning combustion gases.

10. Heating apparatus according to claim 9, wherein the baffle has a concave upper surface facing the inner surface at the top of said burner tube.

11. Heating apparatus according to claim 4, further comprising an electric heater.

12. Heating apparatus according to claim 4, wherein said tap water vessel is cylindrical.

13. Heating apparatus according to claim 1, further comprising an electric heater.

14. Heating apparatus according to claim 1, wherein the baffle has a concave upper surface facing the inner surface at the top of said burner tube.

* * * * *